United States Patent [19]

Kondo et al.

[11] Patent Number: 5,023,705
[45] Date of Patent: Jun. 11, 1991

[54] APPARATUS FOR FORMING A THREE COLOR IMAGE INCLUDING A FIRST, A SECOND, AND A BLACK COLOR FROM TWO COMPLIMENTARY COLORS

[75] Inventors: Shoji Kondo; Yasuhiro Kyoden, both of Osaka, Japan

[73] Assignee: Minolta Camera Kabushiki Kaisha, Osaka, Japan

[21] Appl. No.: 296,194

[22] Filed: Jan. 12, 1989

[30] Foreign Application Priority Data

Jan. 18, 1988 [JP] Japan .................................. 63-9312
Jan. 18, 1988 [JP] Japan .................................. 63-9313

[51] Int. Cl.$^5$ ............................................. H04N 1/46
[52] U.S. Cl. ........................................ 358/80; 358/78
[58] Field of Search ................... 358/75, 79, 80, 494, 358/78; 355/43, 66

[56] References Cited

U.S. PATENT DOCUMENTS

| 2,910,963 | 11/1959 | Herman . |
| 3,572,288 | 8/1968 | Turner . |
| 3,914,043 | 10/1975 | McVeigh . |
| 3,960,445 | 6/1976 | Drawe . |
| 3,967,891 | 7/1976 | Rippstein . |
| 4,099,860 | 7/1978 | Connin . |
| 4,256,400 | 3/1981 | Komori et al. . |
| 4,275,958 | 6/1981 | Tachika et al. . |
| 4,336,994 | 6/1982 | Banton . |
| 4,346,982 | 8/1982 | Nakajima et al. . |
| 4,373,798 | 2/1983 | Tsukada et al. . |
| 4,572,102 | 2/1986 | Yuge et al. . |
| 4,579,443 | 4/1986 | Abuyama et al. . |
| 4,582,417 | 4/1986 | Yagasaki et al. . |
| 4,587,568 | 5/1986 | Takayama et al. . |
| 4,619,514 | 10/1986 | Ide . |
| 4,627,707 | 12/1986 | Tani et al. . |
| 4,634,259 | 1/1987 | Oishi et al. . |
| 4,641,602 | 2/1987 | Kasai . |
| 4,655,580 | 4/1987 | Watanabe et al. . |
| 4,657,376 | 4/1987 | Ide . |
| 4,659,211 | 4/1987 | Oka . |
| 4,666,288 | 5/1987 | Watanabe . |
| 4,668,978 | 5/1987 | Gokita . |
| 4,685,794 | 8/1987 | Watanabe . |
| 4,690,543 | 9/1987 | Watanabe . |
| 4,710,016 | 12/1987 | Waatanabe . |
| 4,720,730 | 1/1988 | Ito . |
| 4,723,148 | 2/1988 | Hamakawa . |
| 4,728,985 | 3/1988 | Nakashima et al. . |
| 4,731,637 | 3/1988 | Acquaviva et al. . |
| 4,740,811 | 4/1988 | Watanabe . |
| 4,743,945 | 5/1988 | Ito et al. . |
| 4,743,946 | 5/1988 | Nishimori et al. . |
| 4,745,437 | 5/1988 | Oka et al. . |
| 4,746,954 | 5/1988 | Matuura et al. . |
| 4,754,301 | 6/1988 | Kasamura et al. . |
| 4,772,921 | 9/1988 | Ito . |
| 4,864,411 | 9/1989 | Hale et al. ............................ 358/494 |
| 4,872,062 | 10/1989 | Nanba ................................... 358/75 |
| 4,926,252 | 5/1990 | Nagano .................................. 358/75 |

FOREIGN PATENT DOCUMENTS

| 0325118 | 7/1989 | European Pat. Off. .............. 358/75 |
| DE3705511 | 9/1987 | Fed. Rep. of Germany . |
| 48-22212 | 7/1973 | Japan . |
| 51-134635 | 11/1976 | Japan . |
| 54-30833 | 3/1979 | Japan . |
| 60-170868 | 9/1985 | Japan . |
| 60-194469 | 10/1985 | Japan . |
| 60-212778 | 10/1985 | Japan . |
| 61-72270 | 4/1986 | Japan . |
| 61-203474 | 9/1986 | Japan . |
| 62-61464 | 3/1987 | Japan . |
| 62-90186 | 6/1987 | Japan . |
| 62-59504 | 12/1987 | Japan . |

Primary Examiner—James J. Groody
Assistant Examiner—Kim Yen Vu
Attorney, Agent, or Firm—Burns, Doane, Swecker & Mathis

[57] ABSTRACT

The present invention relates to apparatus for forming multicolor images in accordance with image data read by image reading unit which includes a photoelectric transducer. The apparatus of the invention has a printing device for printing in blue and red, and reproduces black by overlapping blue and red.

19 Claims, 8 Drawing Sheets

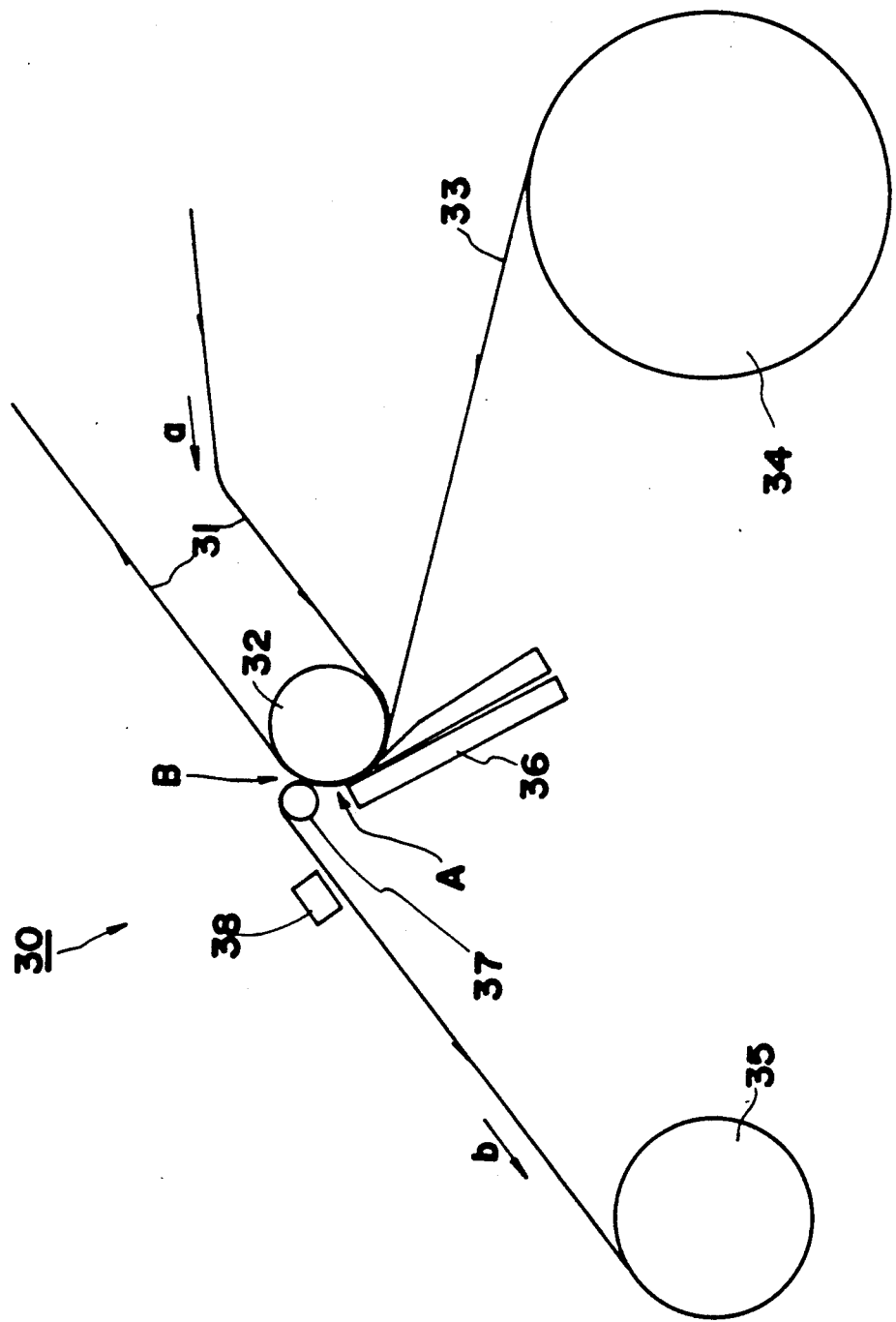

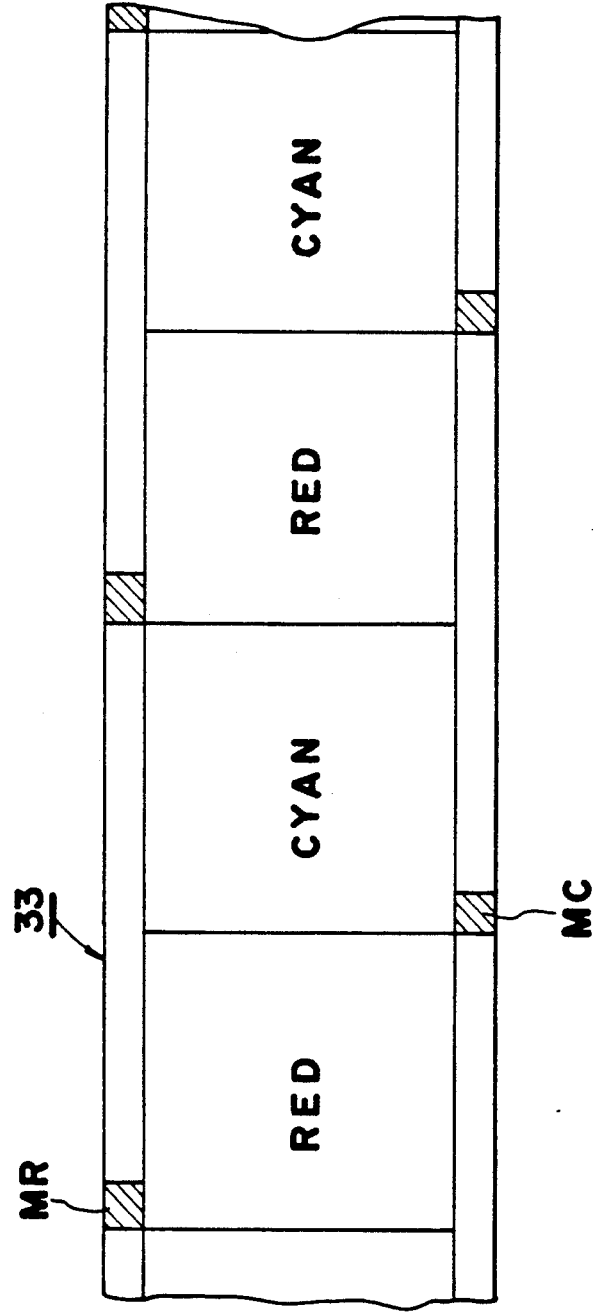

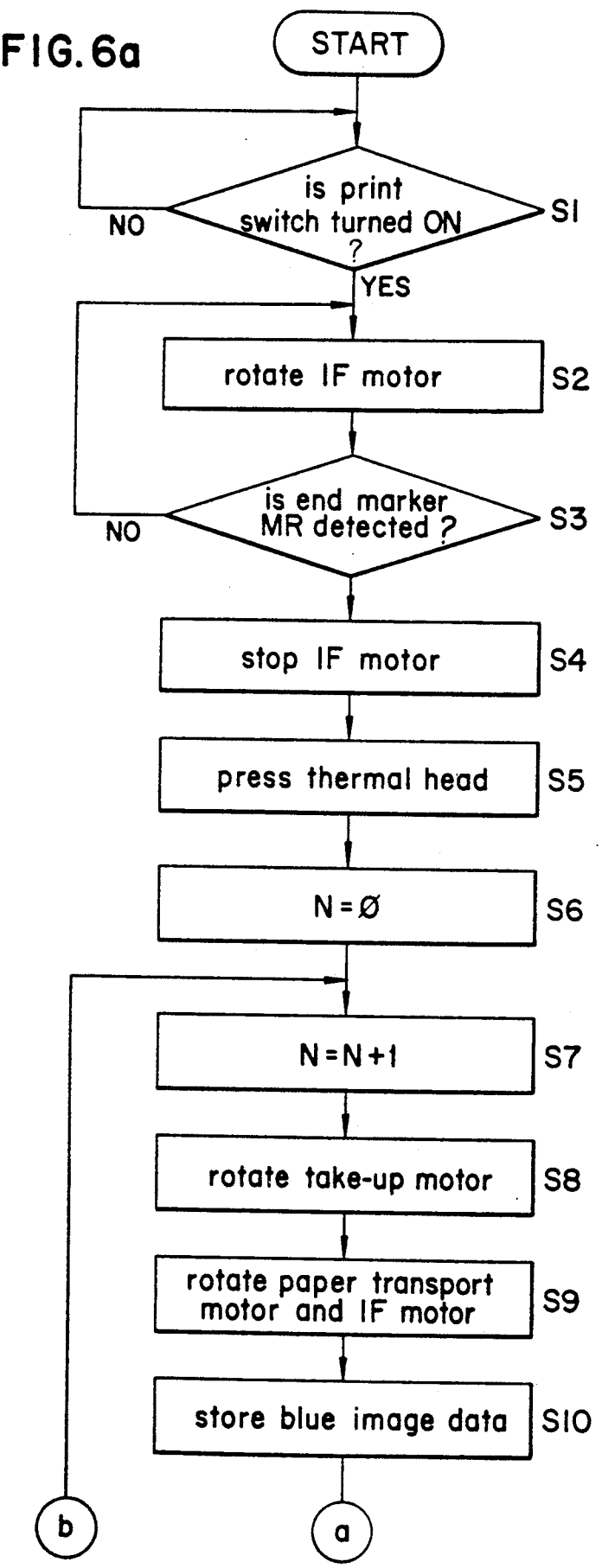

APPARATUS FOR FORMING A THREE COLOR IMAGE INCLUDING A FIRST, A SECOND, AND A BLACK COLOR FROM TWO COMPLIMENTARY COLORS

BACKGROUND OF THE INVENTION

1. Field of the Invention

The present invention relates to apparatus for forming multicolor images in accordance with image data read by image reading means including a photoelectric transducer, and more particularly to a color image forming apparatus, for example, for use as an electronic print board which has a writing surface like a white board for writing a multicolor image thereon with pen means and which comprises reading means for reading the image and printing means for printing a multicolor image in accordance with the read image data.

2. Description of the Related Art

Recently electronic print boards have been introduced into use, for example, in meetings which are adapted to print on paper images written on a white board or sheet with a felt pen or the like. With these electronic print boards, the image written on the writing surface is read optically, and the resulting image data is printed out by a thermal printer or the like.

Writing implements of more than one color, as of black, red and blue, are usable for electronic print boards, whereas the print boards presently in use are adapted to produce monochromatic (usually black) prints only and are unable to reproduce the written image in different colors as intended by the writer.

On the other hand, the conventional image forming apparatus of digital color copying machines or the like are adapted to read the image of the original through three color separation filters, for example, of red, green and blue to obtain image data as separated in the three colors, and thereafter reproduce a color image according to the image data by the combination of three primary colors, i.e., cyan, yellow and magenta, or of four colors further including black.

Since the colors of writing implements actually in use for electronic print boards are primarily the three colors of black, red and blue, the image to be thereby reproduced need not have as many colors as those produced by usual color printers, nor is it always necessary to reproduce the colors of writing implements with high fidelity. Accordingly, the direct application of conventional color printing techniques to the production of color prints by electronic print boards is not justifiable in respect of control and construction and is also economically disadvantageous.

Further because colors other than black, red blue are seldom used for common documents, the image forming apparatus for copying machines are similarly unjustifiable in respect of control and construction when there is no particular need to use such other colors.

It is presently thought most advantageous from the viewpoint of cost and compacting the printing unit to use the thermal transfer system for color printing. With this system, however, it is required to superimpose three colors for the reproduction of black and two colors for the reproduction of blue and red, i.e., magenta and cyan for blue, and magenta and yellow for red, so that the system has the problem of wasting the ink film and failing to ensure color registration.

The system further requires a prolonged period of time when making a single print since the transfer paper must then be reciprocatingly moved three times.

The use of the electrophotographic system for color printing similarly involves the problem of a failure in color registration and a prolonged printing time because the process for developing an electrostatic latent image with toner and transferring the toner image to copy paper must be repeated for each of different colors.

Further with the method employed for the conventional electronic print board, the separate items of image data obtained by the reading means for different color components are stored in different memories, and the printing means is initiated into operation for producing a color image based on the image data stored in the memories, after the image data for one page has been read. The method therefore requires a further prolonged period of time from the start of reading operation until the completion of printing operation. On the other hand, a color image forming apparatus has been proposed which is adapted to scan the original image every time the image is be printed in one of the component colors without using any memory, but when the apparatus is designed to print, for example, in the three colors of cyan, magenta and yellow, the original must be scanned three times. This entails the problem of producing a louder noise and causing early fatigue to the scanning means.

SUMMARY OF THE INVENTION

The main object of the present invention is to provide an image forming apparatus of low cost which is capable of printing images in three colors.

Another object of the invention is to provide a three-color image forming apparatus which is free of failures in color registration and has a higher printing speed per print.

Another object of the invention is to provide a color image forming apparatus which is shortened in the period of time from the start of reading of the original image until the completion of printing operation.

Another object of the invention is to provide an improved electronic print board for printing multicolor images.

These and other objects of the invention are fulfilled by an apparatus characterized in that the apparatus comprises:

image reading means for reading an original image to produce image signals corresponding to the image, and printing means for printing an image in blue in corresponding relation to a blue portion of the original image, an image in red in corresponding relation to a red portion of the original image and an image in blue and red superimposed thereon in corresponding relation to a black portion of the original image, in accordance with the image signals.

The invention further provides an apparatus characterized in that the apparatus comprises:

image reading means for reading an original image, a plurality of filter means for separating the original image into portions of different specific colors, memory means for storing therein at least a portion of the image data read by the reading means through the filter means, printing means for printing images of different colors individually in succession in accordance with the image data read by the reading means, and control means for controlling the printing means so as to print the image of the first of the colors concurrently with the reading operation by the reading means and print the images of the second and other colors after the reading operation in accordance with the image data stored in the memory means, whereby the time from the start of the image reading operation until the completion of the printing operation can be further shortened.

BRIEF DESCRIPTION OF THE DRAWINGS

These and other objects or features of the present invention will become apparent from the following description of a preferred embodiment thereof taken in conjunction with the accompanying drawings, in which:

FIG. 4 is a diagram showing a printer unit;

FIG. 5 is a diagram showing an ink film for use in the embodiment; and

In the following description, like parts are designated by like reference numbers throughout the several drawings.

DESCRIPTION OF THE PREFERRED EMBODIMENT

An electronic print board embodying the invention will be described below with reference to the drawings.

The term "blue" is used herein as meaning a color perceivable by the viewer as blue and is not always limited to genuine blue. The same is also true of the term "red."

Figure 1:
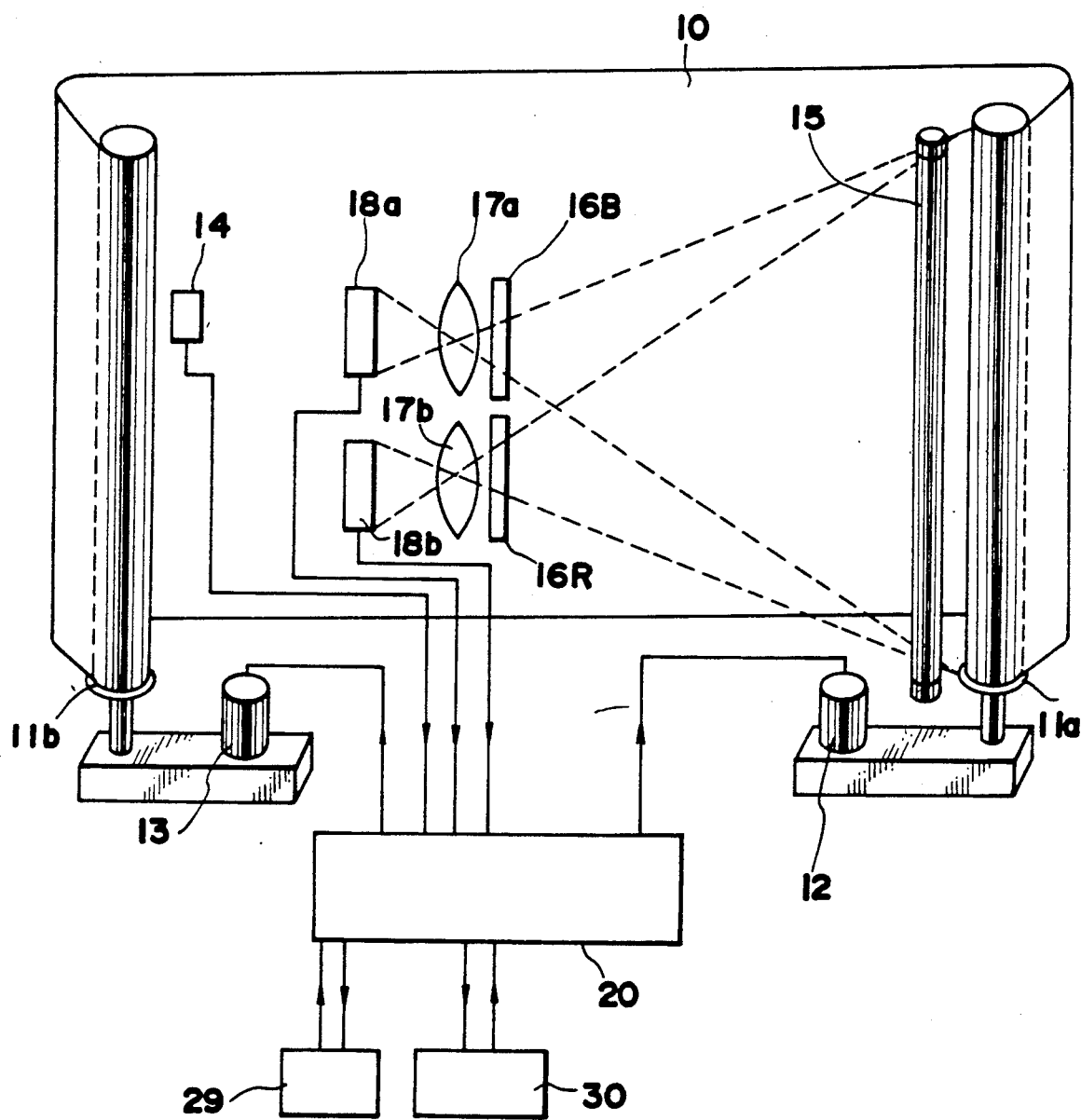
FIG. 1 is a diagram showing the construction of an electronic print board embodying the invention.

FIG. 1 is a diagram showing the electronic print board. Indicated at 10 is a white sheet having a surface which is made of such a material that images can be written on the surface with felt pens or like writing implements and can be erased by wiping with cloth or the like. The sheet is secured at its opposite ends to take-up rollers 11a and 11b and wound thereon. The takeup rollers 11a and 11b are connected to a take-up motor 12 and a reverse motor 13, respectively. The take-up motor 12, when driven, winds up the sheet 10 from portion to portion on the take-up roller 11a. At this time, the take-up roller 11b is disconnected from the reverse motor 13 by an unillustrated clutch to follow the movement of the sheet 10. The sheet 10 bears unillustrated marks arranged at a spacing corresponding to the length of one page. The mark is detectable by a sensor 14 for the sheet 10 to be wound up or rewound by the length of one page at a time. The sheet 10 is rewound by the operation of the reverse motor 13. At this time, the take-up motor 12 is disconnected from the take-up roller 11a by an unillustrated clutch for the take-up roller 11a to follow the movement of the sheet 10.

Figure 2:
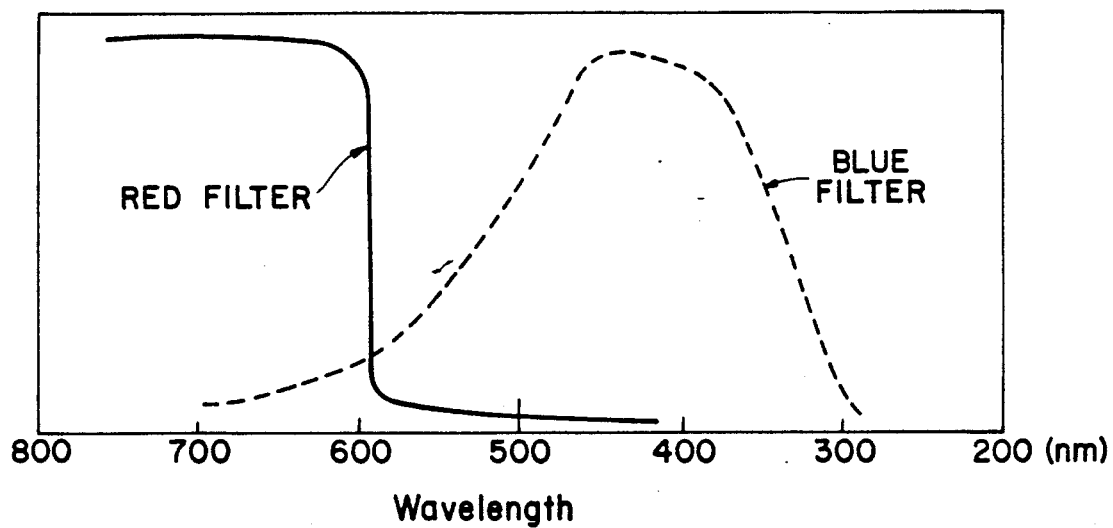
FIG. 2 is a graph showing the transmittance-C wavelength characteristics of color separation filters 16B and 16R shown in FIG. 1.

When an image written on the sheet 10 is to be printed out, the take-up motor 12 is driven to wind the sheet 10 on the take-up roller 11a. At the same time, a fluorescent lamp 15 disposed in parallel to the take-up roller 11a exposes the image on the writing surface of the sheet 10 to light from portion to portion, and the light reflected from the surface is focused on CCD sensors 18a, 18b through filters 16B, 16R and lenses 17a, 17b, respectively, whereby the light is converted to electric signals. The filter 16B and the filter 16R are a blue filter and a red filter, respectively. FIG. 2 shows the transmittance-wavelength characteristics of these filters.

With reference to FIG. 2, the red filter 16R blocks the light up to about 600 nm in wavelength, while the blue filter 16B primarily transmits blue light with a peak wavelength of about 450 nm. While the image on the sheet 10 is written with blue, red and black pens, the red filter 16R passes the light reflected only at the white portion and the portion written with the red pen of the image, and the blue filter 16B passes the light reflected only at the white portion and the portion written with the blue pen of the image. Consequently, the portions written with the red pen and the black pen are read as an image by the CCD sensor 18a, while the portions written with the blue and black pens are read as an image by the CCD sensor 18b. At the printer unit 30 to be described later, the image read by the CCD sensor 18a is printed with a red portion of an ink film, and the image read by the CCD sensor 18b with a blue portion of the ink film. The image portion written with the black pen is expressed by superimposing the red and blue inks.

The operation of the take-up motor 12 and the reverse motor 13, the image reading operation, etc. are controlled by the control circuit to be described below.

Figure 3:
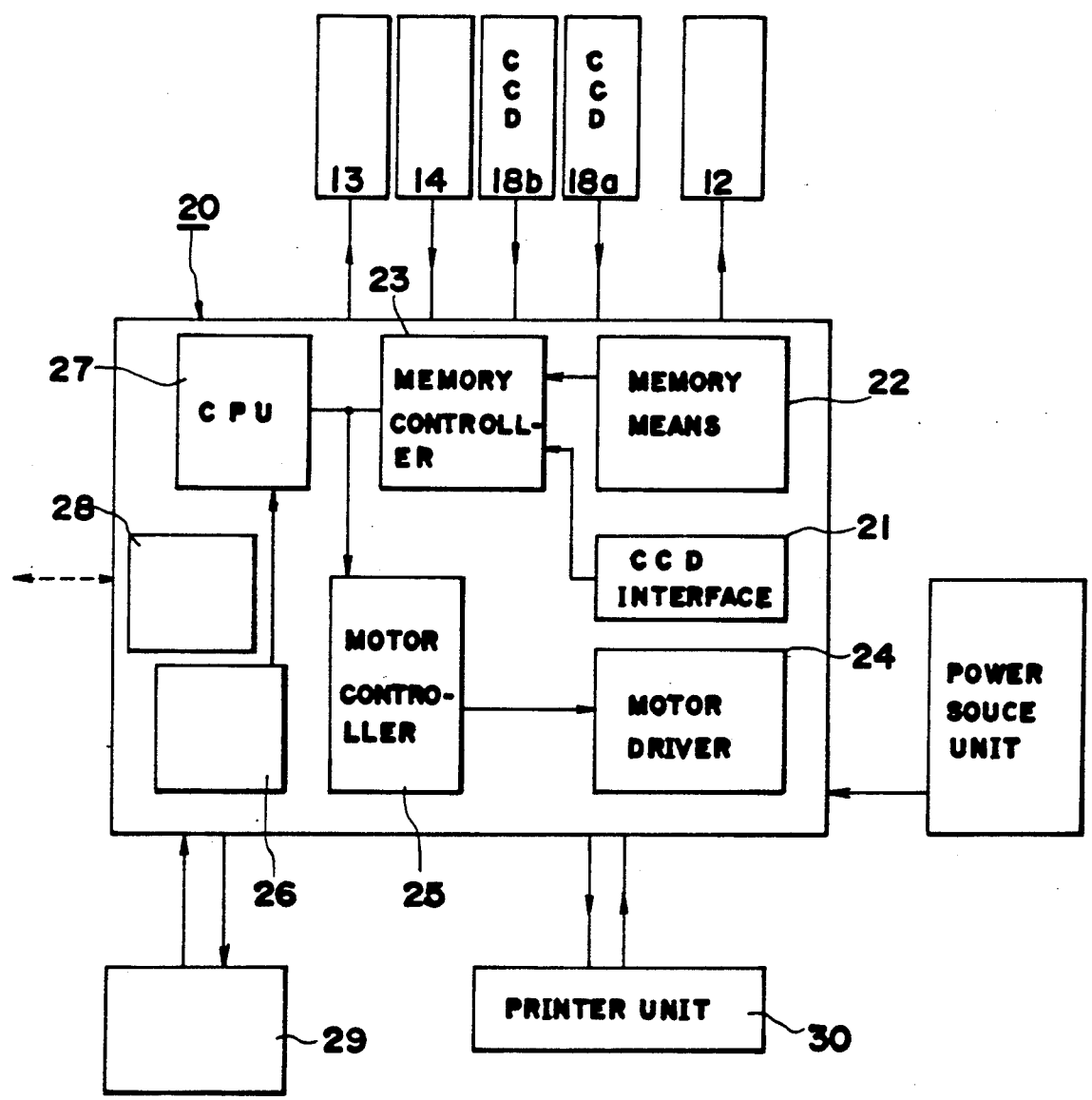
FIG. 3 is a block diagram showing the control circuit of the embodiment.

FIG. 3 is a block diagram showing the control circuit 20 of the present embodiment. The components of the circuit will be described below.

A CCD interface 21 converts the analog image signals delivered from the CCD sensors 18a, 18b to digital signals.

Memory means 22 comprises a ROM having an operation program for the electronic print board, a control RAM and an image memory having a capacity to store image data on at least one page.

A memory controller 23 controls the input and output of signals for the memory means 22.

A motor driver 24 energizes and deenergizes the take-up motor 12, reverse motor 13 and motors for the printer unit 30. The motor driver 24 is controlled by a motor controller 25.

A sensor interface 26 feeds to a CPU 27 signals from the sensor 14 for detecting the page mark for scrolling the sheet 10, sensors in the printer unit 30, etc.

An external interface 28 delivers the read image data to external output units such as a CRT, external printer and the like.

The CPU 27 collectively controls the above data processing system and drive systems.

FIG. 4 schematically shows the construction of the printer unit 30. Transfer paper 31 is passed around a platen roller 32 and feedable forward as indicated at a in the drawing and reversely by paper feed drive means including a paper transport motor which is a pulse motor (not shown). The above-mentioned ink film indicated at 33 extends from a supply roller 34 to a film take-up roller 35 and is in intimate contact at a transfer station A with the transfer paper 31 which is wound around part of the outer periphery of the platen roller 32. The film take-up roller 35 is driven by an unillustrated ink film feed motor (hereinafter referred to as the "IF motor") to transport the ink film in the direction of arrow b shown.

Disposed at the transfer station A is a thermal head 36 for transferring meltable inks on the ink film 33 to the transfer paper 31 by heating. Separating means, e.g. a separating rotatable roller 37, is disposed at a specified distance from the transfer station A toward the direction b of transport of the ink film 33. Further disposed at a specified distance from the roller 37 toward the film transport direction is a sensor 38 for detecting the ink portion forward end of the film and also for detecting the ink color.

With reference to FIG. 5, the ink film 33 comprises a film sheet having approximately the same width as the transfer paper 31 and coated with inks of two colors, i.e. red R and cyan C, alternately longitudinally of the sheet, the ink-coated portions having a definite length. The film sheet is formed at one side thereof with an end marker MR at the forward end of each of the portions coated with red ink R (RED portions) and is provided at the other side thereof with a color detection marker MC at the forward end of each of the portions coated with cyan ink C (CYAN portions).

Thus, the ink film used for the present embodiment bears inks of two colors, i.e., genuine red and cyan. Cyan is used for expressing "blue" because cyan is complementary to genuine red, exhibits a high contrast to red and gives black when mixed with genuine red. Further with electronic print boards, it is not always necessary to reproduce the colors of the original image with fidelity; when cyan is used for expressing "blue," the three colors of "red," "blue" and "black" can be expressed. Although inks of genuine red and cyan are most desirable to use in combination, these colors are of course not limitative; "red" may be expressed by "slightly orange red," which may be mixed with genuine blue for expressing black. Thus, the combination of ink colors for giving "blue," "red" and "black" can be selected as desired.

Figure 6B:
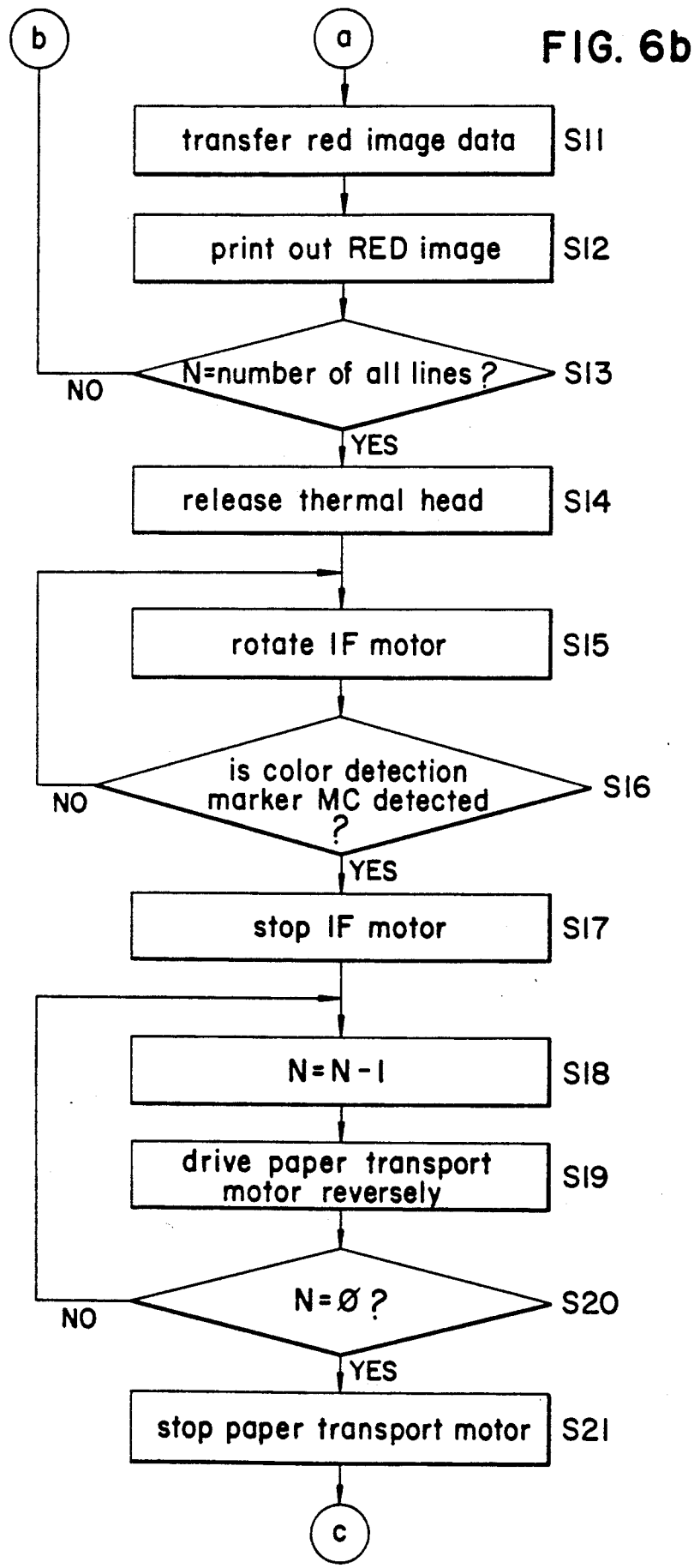
FIG. 6 (a) to 6 (c) are flow charts showing the process to be executed by the control circuit.
Figure 6C:
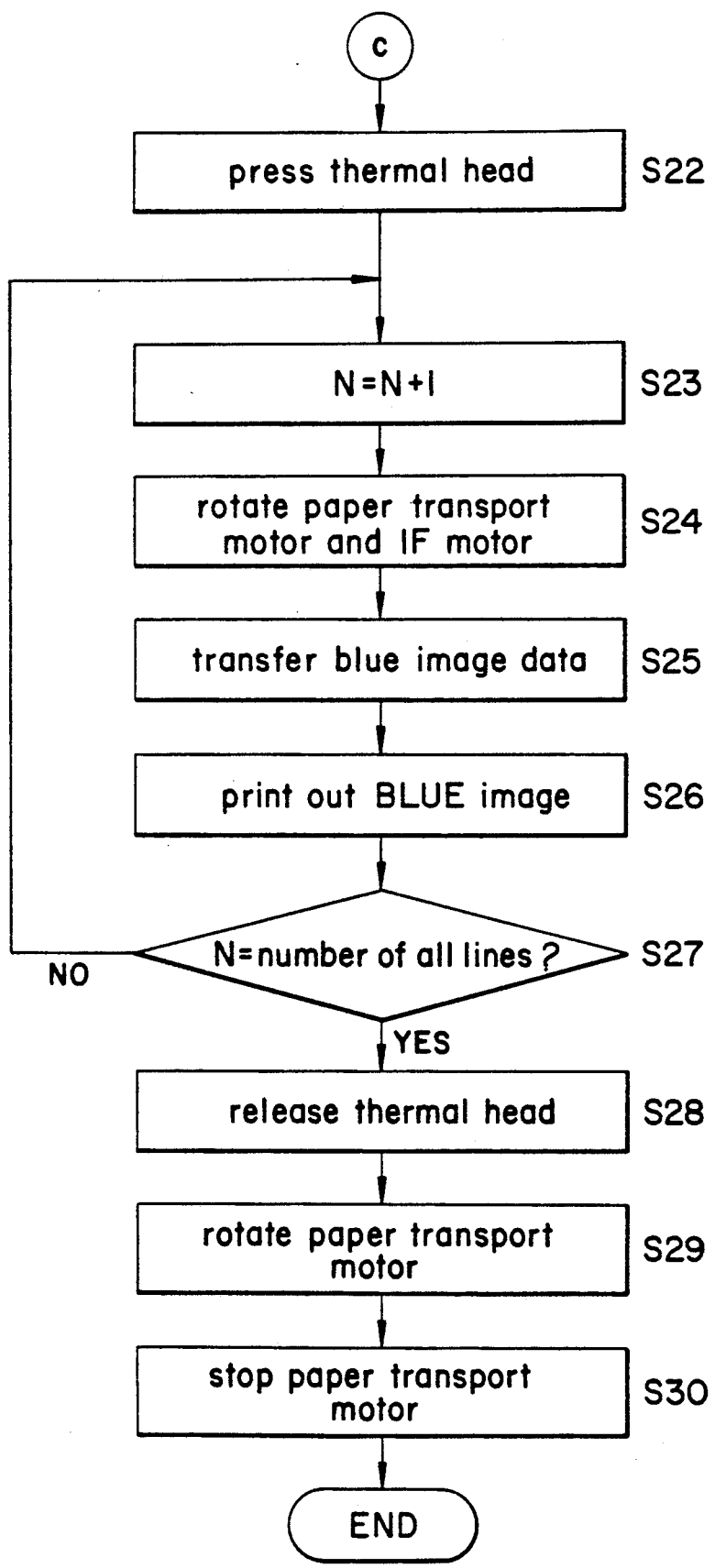

Next, the control process to be executed by the CPU 27 will be described with reference to the flow charts of FIG. 6 (a) to FIG. 6 (c).

The print switch is turned on in step S1, whereupon the IF motor rotates to wind up the ink film 33 (step S2). The sensor 38 detects an end marker MR on the film to thereby detect the forward end of a RED portion of the ink film (step S3), whereupon the IF motor is stopped (step S4), and the thermal head 36 is pressed against the ink film 33 (step S5). The value N of a line address register for showing the address of the line being currently processed is changed to 0 (step S6), and 1 is then added to N (step S7). The takeup motor 12 is thereafter rotated by an amount corresponding to one line to move the sheet 10 by one line (step S8). The unillustrated paper transport motor and the IF motor are rotated by an amount corresponding to one line to advance the transfer paper 31 and the ink film 33 by one line (step S9). The blue image data on the Nth line obtained by the CCD sensor 18b is stored in the image memory in the memory means 22 (step S10). The red image data obtained from the Nth line by the CCD sensor 18a is transferred to the thermal head 36 to print out the data, i.e. the corresponding red portion of the image on the sheet 10 (step S12). Step S13 inquires whether the value N is equal to the number of all lines of the image. If the answer is negative, the sequence returns to step S7, in which 1 is added to N, and the same steps as above are repeated. If the value N is equal to the number of all lines, the thermal head 36 is released from pressing contact with the ink film 33 in step S14. The IF motor is driven until the sensor 38 detects the color detection marker MC to detect the forward end of a CYAN portion (steps S15 to S17). The paper transport motor is then reversely driven until the value N decreases to 0 to return the transfer paper 31 line by line to the line 0 (steps S18 to S21). The thermal head 36 is pressed into contact with the ink film 33 again (step S22), 1 is added to N (step S23), and the paper transport motor and the IF motor are rotated by an amount corresponding to one line to advance the transfer paper 31 and the ink film 33 by an amount of one line (step S24). The blue image data on the Nth line is transferred from the memory means 22 to the thermal head (step S25) to print out the corresponding blue image portion (step S26). When the image has been printed out for all the lines (step S27), the thermal head 36 is released from the ink film (step 28). For the discharge of the transfer paper, the paper transport motor is rotated to delivery a predetermined length of the paper 31 (step S29), whereupon the paper transport motor is stepped.

While the present embodiment generally operates as described above, the take-up motor 12 may be driven upon the completion of reading of the image by the CCD sensors 18a, 18b until the sensor 14 detects the next page mark to expose the next page as a writing surface. Alternatively, the reverse motor 13 may be driven after the completion of image reading operation to expose the read image. The sheet 10 can be rewound by one page at a time by depressing an unillustrated button.

Although the present embodiment produces a single print by one reading operation, the embodiment may be adapted to produce a plurality of prints when so required. In this case, the red image data read by the CCD sensor 18a is stored in an image memory simultaneously when the data is transferred to the thermal head 36, and the data is derived from the image memory when the second and following prints are to be made like the blue image data.

While the image of first color is printed concurrently with and at the same speed as the image reading operation according to the present embodiment, the read image data may be stored in a memory first and thereafter read out from the memory for printing. The printing speed can then be lower than the reading speed. If the embodiment is adapted to start printing the image of first color a predetermined period of time after the start of the image reading operation, the printing speed can alternatively be higher than the reading speed.

Although the present embodiment includes two CCD sensors for reading the red data and the blue data at the same time, one CCD sensor may be used for reading these two items of color data in succession.

The present invention is applicable also to electronic print boards of the type wherein the image on a white board is read by scanning the board with an optical system unlike the present embodiment wherein a sheet is wound up on a roller.

The printer, which is of the thermal transfer type in the embodiment, can be other printer, such as a laser printer. The present invention is applicable also to apparatus other than electronic print boards, such as digital color copying machines.

Although the present invention has been fully described by way of example with reference to the accompanying drawings, it is to be noted that various changes and modifications will be apparent to those skilled in the art. Therefore, unless otherwise such changes and modifications depart from the scope of the invention, they should be construed as being included therein.

What is claimed is:

1. A printing device for forming an image from an original image which includes first color, second color and black color portions, the device comprising:

reading means for reading said first color, second color and black color portions of the original image;

first printing means for printing in the first color an image corresponding to said first color and black color portions read by said reading means and second printing means for printing in the second color an image corresponding to said second color and black color portions read by said reading means so that the black color is reproduced by overlapping the first and second colors.

2. A printing device as claimed in claim 1, wherein said first color is blue, and said second color is red.

3. A printing device as claimed in claim 1, wherein said reading means having filter means for transmitting light of said first color without transmitting light of said second color and filter means for transmitting light of said second color without transmitting light of said first color.

4. A printing device for printing an image from an original image with three colors which includes black and two other colors, the printing device comprising:

printing means including means for printing in a first color different from black and means for printing in a second color different from black;

reading means for reading the original image and for outputting a first signal corresponding to portions of the first color and the black color separate from portions of the second color and outputting a second signal corresponding to portions of the second color and the black color separate from portions of the first color; and control means for enabling said printing means to print an image corresponding to said first signal in the first color to print an image corresponding to said second signal in the second color, whereby the printing device prints images in both the first and second color and overlapping portions of the first and second color correspond to said black color portions of the original image.

5. A printing device as claimed in claim 4, wherein said first color is blue, and said second color is red.

6. A printing device as claimed in claim 4, wherein said reading means having filter means for transmitting light of said first color without transmitting light of said second color and filter means for transmitting light of said second color without transmitting light of said first color.

7. An electronic print board for printing in three colors, comprising:

a writing surface on which an image is written with a writing means;

reading means for reading the image written on said writing surface and generating first image signals corresponding to portions written in a first color and portions written in a black color and generating second image signals corresponding to portions written in a second color and the portions written in black color; and printing means essentially consisting of means for printing the first color and means for printing in second color, for printing images corresponding to the first and second image signals from said reading means, said printing means printing images in the first color corresponding to the first image signals and printing images in the second color corresponding to the second image signals.

8. An electronic print board as claimed in claim 7, wherein said first color is blue, and said second color is red.

9. An electronic print board as claimed in claim 7, further comprising first filter means which is positioned between said writing surface and said reading means and which transmits light of only the first color, second filter means which is positioned between said writing surface and said reading means and which transmits light of only the second color, and control means for enabling said printing means in relation with said reading means to print images in the second color in accordance with the image read by said reading means through said first filter means and in the first color in accordance with the image read through said second filter means.

10. An electronic print board as claimed in claim 9, wherein said first color is blue, and said second color is red.

11. An electronic print board as claimed in claim 9, wherein said reading means comprises light means for illuminating the image on said writing surface, image sensor means disposed linearly for providing electrical signals corresponding to the image on a scanning line and scanning means for moving said image sensor and said writing surface relative to each other.

12. An electronic print board for printing in three colors, comprising:

a writing surface on which an image is written with a writing means;

first filter means for discriminating portions of the image on said writing surfaces writing in blue and black;

second filter means for discriminating portions of the image on said writing surface written in red and black;

readings means for providing an output signal corresponding to images received through said first and second filter means;

first printing means for printing portions in blue corresponding to the portions discriminated by said first filter means in accordance with said output signal from said reading means; and second printing means for printing portions in red corresponding to the portions discriminated by said second filter means in accordance with said output signal from said reading means, whereby said electronic print board prints portions in both blue and red corresponding to portions written in black on said writing surface.

13. An electronic print board claimed in claim 12, further comprising control means for operating said first and second printing means sequentially.

14. An electronic print board for printing in three colors, comprising:

a writing surface on which an image is written with writing means;

reading means for reading the image written on said writing surface and generating image signals corresponding to the image;

first printing means for printing portions in blue in accordance with the image signals generated by said reading means;

second printing means for printing portions in red in accordance with the image signals generated by said reading means; and control means for operating said first printing means to print portions corresponding to blue portions of the image on said writing surface, operating said second printing means to print portions corresponding to red portions on said writing surface and operating said first and second printing means to print portions corresponding to black portions on said writing surface.

15. A printing device comprising:

image reading means for reading an original image;

a plurality of filter means for separating the original image into portions of different specific colors;

memory means for storing therein the image data read by the reading means through the filter means;

printing means for printing images of different colors individually in succession in accordance with the image data read by the reading means; and control means for controlling the printing means so as to print the image of a first and the colors concurrently with the reading operation by the reading means and print the image of a second color after the reading operation in accordance with the image data stored in the memory means.

16. A printing device comprising:

reading means for reading an original image and generating first and second image signals in accordance with colors of the original image;

first printing means for printing an image corresponding to the first image signal in a first color different from black color; and second printing means for printing an image corresponding to the second image signal in a second color, which is substantially complementary of the first color, so that a black color image is reproduced by overlapping the images printed by first and second printing means.

17. A printing device comprising:

printing means for printing images in accordance with image signals including signals corresponding to image portions of black and first and second colors other than black, said printing means including first means for printing an image in accordance with the signals corresponding to image portions of black and the first color and second means for printing an image, which is different in color from the image printed by the first means, in accordance with the signals corresponding to image portions of black and the second color so that a black color image is reproduced by overlapping the images by first and second means; and means for providing the signals corresponding to image portions of black and the first color to said first means and providing the signals corresponding to image portions of black and the second color.

18. A printing device claimed in claim 17, wherein the color of image printed by said second means is a complementary color of the color of image printed by said first means.

19. A printing device comprising:

first printing means for printing images in a first color different from black in accordance with an image signal;

second printing means for printing images in a second color, which is a complementary color of the first color, in accordance with an image signal; and means for providing the image signal corresponding to images to be printed in the first color and images to be printed in black color to said first printing means, and providing the image signal corresponding to images to be printed in the second color and the images to be printed in black color to said second printing means so that black color image is produced by overlapping the first and second colors.

* * * * *